United States Patent [19]
Rocchi

[11] Patent Number: 4,538,907
[45] Date of Patent: Sep. 3, 1985

[54] DEVICE FOR DETERMINING DISTANCE OF AREA ILLUMINATED BY PULSED LASER

[75] Inventor: Luigi Rocchi, Rome, Italy

[73] Assignee: Selenia - Industrie Elettroniche Associate - S.p.A., Rome, Italy

[21] Appl. No.: 471,029

[22] Filed: Mar. 1, 1983

[30] Foreign Application Priority Data

Mar. 1, 1982 [IT] Italy ............... 47884 A/82

[51] Int. Cl.³ .................. G01C 3/10; G01C 3/08
[52] U.S. Cl. ............................. 356/1; 356/5
[58] Field of Search ................... 356/1, 5, 141

[56] References Cited

U.S. PATENT DOCUMENTS 3,217,592 11/1965 Braun et al. ............... 356/1
4,136,949 1/1979 Hayamizu et al. .......... 356/1
4,352,556 10/1982 Haefliger et al. .......... 356/1

Primary Examiner—S. C. Buczinski
Assistant Examiner—Linda J. Wallace
Attorney, Agent, or Firm—Karl F. Ross; Herbert Dubno

[57] ABSTRACT

In order to determine the distance of a target, illuminated by a remote pulsed laser, from a nearby observation point, the time interval between the arrivals of a direct laser pulse and of a reflection of the same pulse from the target is measured along with the angle included between the two directions of incidence. From these data the target distance can be calculated with reasonable accuracy, e.g. for the purpose of emitting an alarm signal if the calculated distance lies within a predetermined range. The device implementing this procedure could also be used in a feedback loop of a system for the automatic pointing of a pulsed laser beam.

4 Claims, 5 Drawing Figures

DEVICE FOR DETERMINING DISTANCE OF AREA ILLUMINATED BY PULSED LASER

FIELD OF THE INVENTION

My present invention relates to a system, disposed at an observation point such as an elevated platform, for determining the distance of that point from a nearby target area illuminated by a pulsed laser.

BACKGROUND OF THE INVENTION

Although the term "target" does not necessarily denote an object or location pinpointed by an attacker, the determination of such a distance is of primary interest in the field of so-called electronic warfare in which a missile of the type known as surface-to-air laser-guided projectile (SALGP) is aimed at a tank, a naval vessel or some other weapons carrier. Devices are already known for determining the relative position of an observation platform or post and a laser-illuminated area. Two such devices, manufactured in the United States, bear the designations LAHAWS (made by Fairchild Camera and Instrument Corp.) and AM/AVR-2 (made by Perkin-Elmer Corp.). As far as I am aware, however, no system exists for determining the distance of the illuminated area from the observation platform or post.

The knowledge of that distance would be significant in actual warfare in order that an operator of the threatened target may be alerted to the danger in time for taking effective countermeasures such as evasive movements or the generation of a smoke-screen. Conversely, this type of information can be used in a feedback loop from a forward point to correct the aim of a laser beam.

OBJECT OF THE INVENTION

Thus, the object of my present invention is to provide a system for determining the distance of such a laser-illuminated area with reasonable accuracy and, if necessary, for emitting an alarm signal when that distance is found to lie within predetermined limits from the observation point.

SUMMARY OF THE INVENTION

In accordance with my present invention, an estimate of the distance of interest (referred to hereinafter as the target distance) is obtained by means of a system comprising receiving means responsive to pulses of incident laser radiation arriving in rapid succession from two different directions, the first of these pulses being assumedly due to direct illumination by diffused radiation from a remote pulsed laser aimed at a nearby target area while the second pulse is assumed to result from reflection of the same laser pulse by that target area. The interval elapsed between the arrivals of the two pulses is measured by timing means and the divergence angle included between two directions of incidence is calculated by trigonometric means, both these means being coupled to the receiving means. An estimate of the target distance is computed from the measured time interval and the calculated divergence angle by arithmetic means connected to the timing and trigonometric means.

BRIEF DESCRIPTION OF THE DRAWING

The above and other features of my invention will now be described in detail with reference to the accompanying drawing in which:

FIG. 2 is a diagram similar to FIG. 1 taken in the plane of the three locations referred to;

SPECIFIC DESCRIPTION

Figure 1:
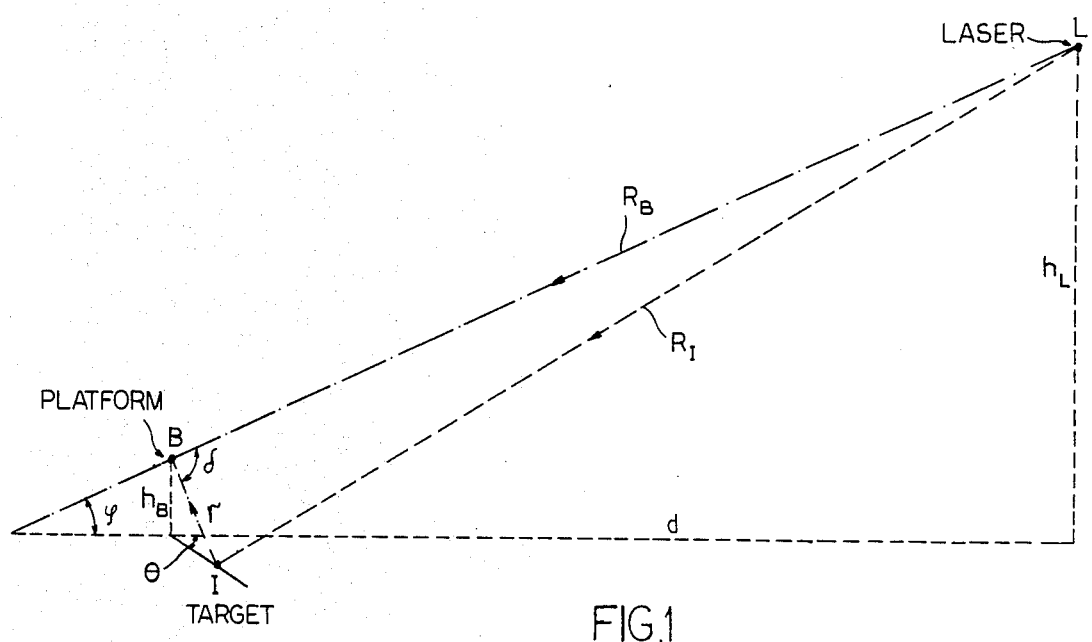
FIG. 1 is a diagrammatic view of the relative positions of an observation platform, a nearby target and a remote laser trained upon the latter.

FIG. 1 shows, in schematic perspective, the locations of an elevated observation platform B, a target I considered to be at ground level, and a possibly airborne laser L remote from points B and I. The elevations of platform B and laser L above the level of target I have been indicated at $h_B$ and $h_L$, respectively. At $R_I$ and $R_B$ I have shown two rays of a pulsed laser beam respectively arriving at target I and platform B, the beam being primarily aimed at the target I. The ground distance between the platform and the laser, designated d, is many times larger than the distance r separating the target I from the platform B; both these distances, however, are initially unknown to an observer on the platform. The angle of elevation of ray $R_B$ is indicated at $\rho$ whereas $\theta$ represents the azimuth angle between directions $\overline{BL}$ and $\overline{BI}$. The angle included between the directly incident ray $R_B$ and a reflected ray arriving on line $\overline{BI}$, as seen at platform B, is designated $\delta$.

Figure 2:
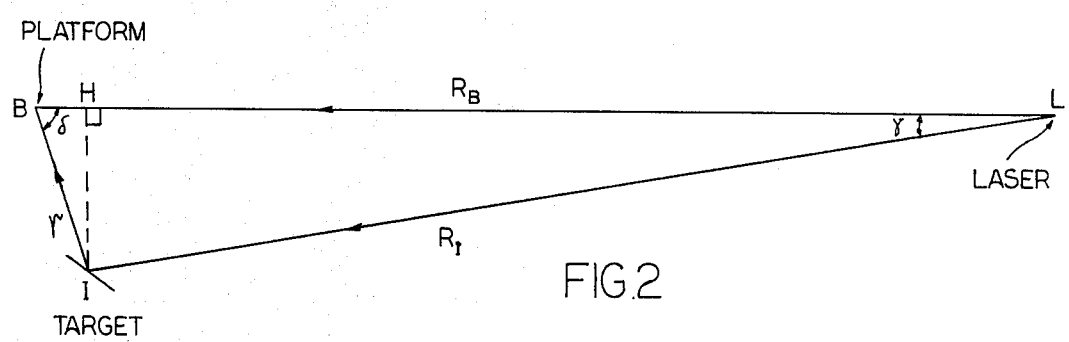

FIG. 2 shows the relative locations of the laser L, the platform B and the target I as seen in the plane of these three points. This Figure further indicates a small angle $\gamma$, included between rays $R_I$ and $R_B$, as well as the perpendicular to ray $R_B$ drawn from the target location I. The distance $\overline{LH}$ is given by $\overline{LI}\cos\gamma$ and, with $\gamma$ generally less than 2° in the depicted scenario is practically equal to $\overline{LI}$. Since the distance $\overline{BH}$ is given by $r\cdot\cos\delta$, the difference $\Delta R$ between the direct path of a laser pulse arriving at station B via ray $R_B$ and an indirect pulse arriving via ray $R_I$ at target I before being reflected toward station B is given, with time difference $\Delta t = \Delta R/c$, by $$\Delta R = \overline{LI} + \overline{IB} - \overline{BL} \approx \overline{LH} + r - (\overline{LH} + r\cdot\cos\delta) \quad (1)$$

whence $$r \approx \frac{c\cdot\Delta t}{1 - \cos\delta} \quad (2)$$

where c is the propagation velocity of the laser radiation in air. Obviously, the foregoing approximation becomes the more exact the smaller the beam angle $\gamma$.

Figure 3:
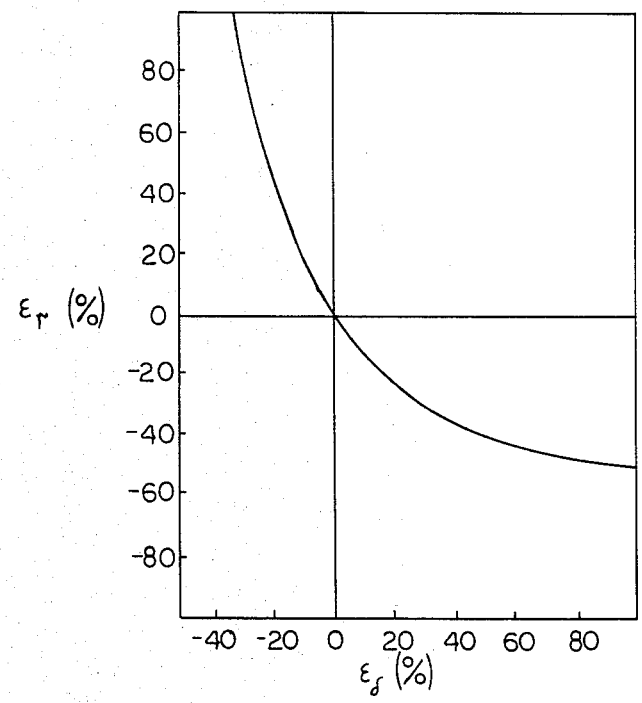
FIG. 3 is a graph showing the error of estimated distance as a function of angle error.

In order to determine the distance r, therefore, it is necessary to find the values of the time difference $\Delta t$ and the divergence angle $\delta$. Owing to the linear relationship between r and $\Delta t$, any proportional error in the determination of the time difference will affect the result r in the same proportion. Percentual errors $\epsilon_\delta(\%)$ in the determination of divergence angle $\delta$, however, are nonlinearly translated into percentual distance errors $\epsilon_r(\%)$ as indicated in the graph of FIG. 3. As will be apparent from this graph, the angular error $\epsilon_\delta(\%)$ should be well below $\pm 20\%$ in order to keep the deviation $\epsilon_r(\%)$ within $\pm 10\%$.

The following Table 1 lists, for several representative scenarios, the values of divergence angle δ (in degrees), source distance $\overline{BL}$ (in kilometers), actual target distance $\overline{BI}$ (in meters), beam angle γ (in degrees), time difference Δt (in nanoseconds), estimated target distance $\overline{BI}^*$ (in meters) and the resulting estimate error (in percent), on the assumption that there are no measuring errors in the determination of δ and Δt.

TABLE 1

| δ (degrees) | $\overline{BL}$ (km) | actual $\overline{BI}$(m) | γ degrees | Δt (ns) | estimated $\overline{BI}^*$ (m) | Error (%) |
|---|---|---|---|---|---|---|
| 45 | 1.5 | 50 | 1.38 | 50.2 | 51.46 | 2.9 |
| 90 | 1.5 | 50 | 1.91 | 169.4 | 50.83 | 1.7 |
| 135 | 2 | 100 | 1.96 | 573.1 | 100.71 | 0.7 |
| 180 | 2 | 100 | 0 | 666.7 | 100 | 0 |
| 90 | 10 | 300 | 1.72 | 1015 | 304.50 | 1.5 |
| 135 | 15 | 500 | 1.32 | 2858.7 | 502.38 | 0.5 |

The foregoing discussion does not take into consideration the effect of the azimuth angle θ upon the distance estimate. The following Table 2 lists, again for several representative scenarios, the values of angle θ (in degrees), platform elevation $h_B$ (in meters), laser elevation $h_L$ (in meters), ground distance d (in kilometers), time difference Δt (in nanoseconds), actual target distance $\overline{BI}$ (in meters), estimated target distance $\overline{BI}^*$ (in meters), absolute error (in meters) and relative error (in percent). This Table is based, again, on the assumption that there are no other error sources.

TABLE 2

| θ (degrees) | $h_B$(m) | $h_L$(m) | d(km) | Δt (ns) | actual $\overline{BI}$(m) | estimated $\overline{BI}^*$(m) | Error (m) | Error (%) |
|---|---|---|---|---|---|---|---|---|
| 45 | 3 | 250 | 1.5 | 53 | 50 | 54.1 | 4.1 | 8.2 |
| 90 | 3 | 250 | 1.5 | 171 | 50 | 51.2 | 1.2 | 2.4 |
| 135 | 3 | 500 | 2 | 285 | 50 | 50.3 | 0.3 | 0.7 |
| 180 | 3 | 500 | 2 | 331 | 50 | 49.7 | 0.3 | 0.7 |

Figure 4:
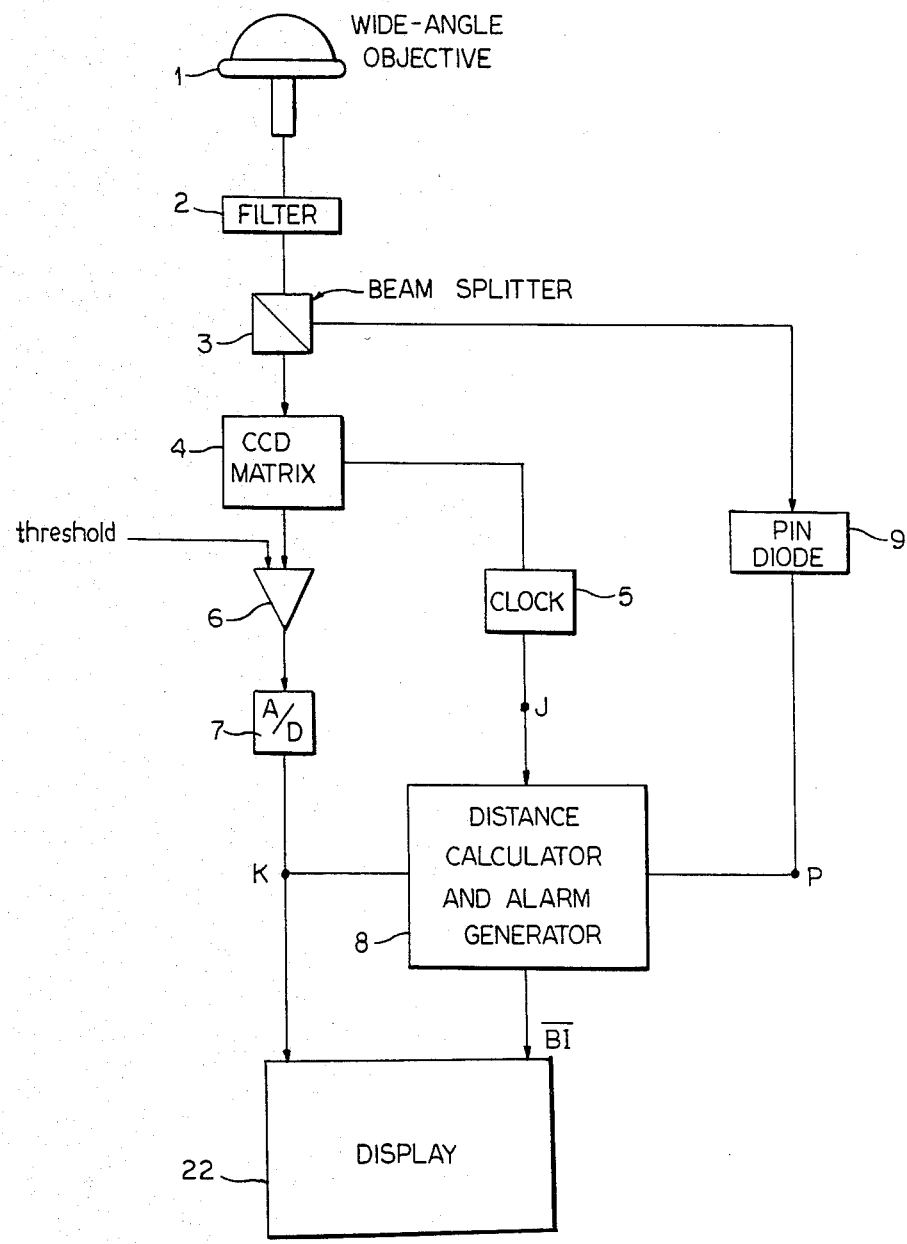
FIG. 4 is a block diagram of a system embodying my invention.

FIG. 4 shows a system, installed at the elevated station B of FIGS. 1 and 2, for determining the target distance from the timing and angles of incidence of arriving laser pulses in accordance with the foregoing algorithm. The system comprises a radiation receiver 1 in the form of a wide-angle objective which focuses an incoming laser pulse from within the area of observation via a narrow-band optical filter 2, centered on the laser frequency, and a beam splitter 3 upon an array 4 of photodectors, specifically a matrix of charge-coupled devices (CCD). The CCD matrix 4 is scanned by rapidly recurring pulses from a clock 5 which also works into an input terminal J of an arithmetic unit 8, serving as a distance calculator and alarm generator, more fully described hereinafter with reference to FIG. 5. Part of the incident laser radiation, e.g. about 20% thereof, is directed by the beam splitter 3 upon another photodetector 9, specifically a PIN diode, whose output is connected to another input terminal P of unit 8. When a laser-illuminated cell of matrix 4 generates an output voltage surpassing a predetermined threshold, an amplifier 6 feeds this voltage to an analog/digital converter 7 supplying that information to a further input terminal K of unit 8. A display unit 22, such as an oscilloscope, visually indicates the location of the illuminated target I upon being triggered by a signal from terminal K. That location is determined by distance information from arithmetic unit 8 and by elevation and azimuth information from non-illustrated conventional equipment, such as the LAHAWS and AM/AVR-2 systems referred to above, based on the position of a light pulse on matrix 4 as given by the coincidence of a resulting voltage pulse on terminal K with a particular timing pulse occurring within a frame-scanning cycle of clock 5.

Figure 5:
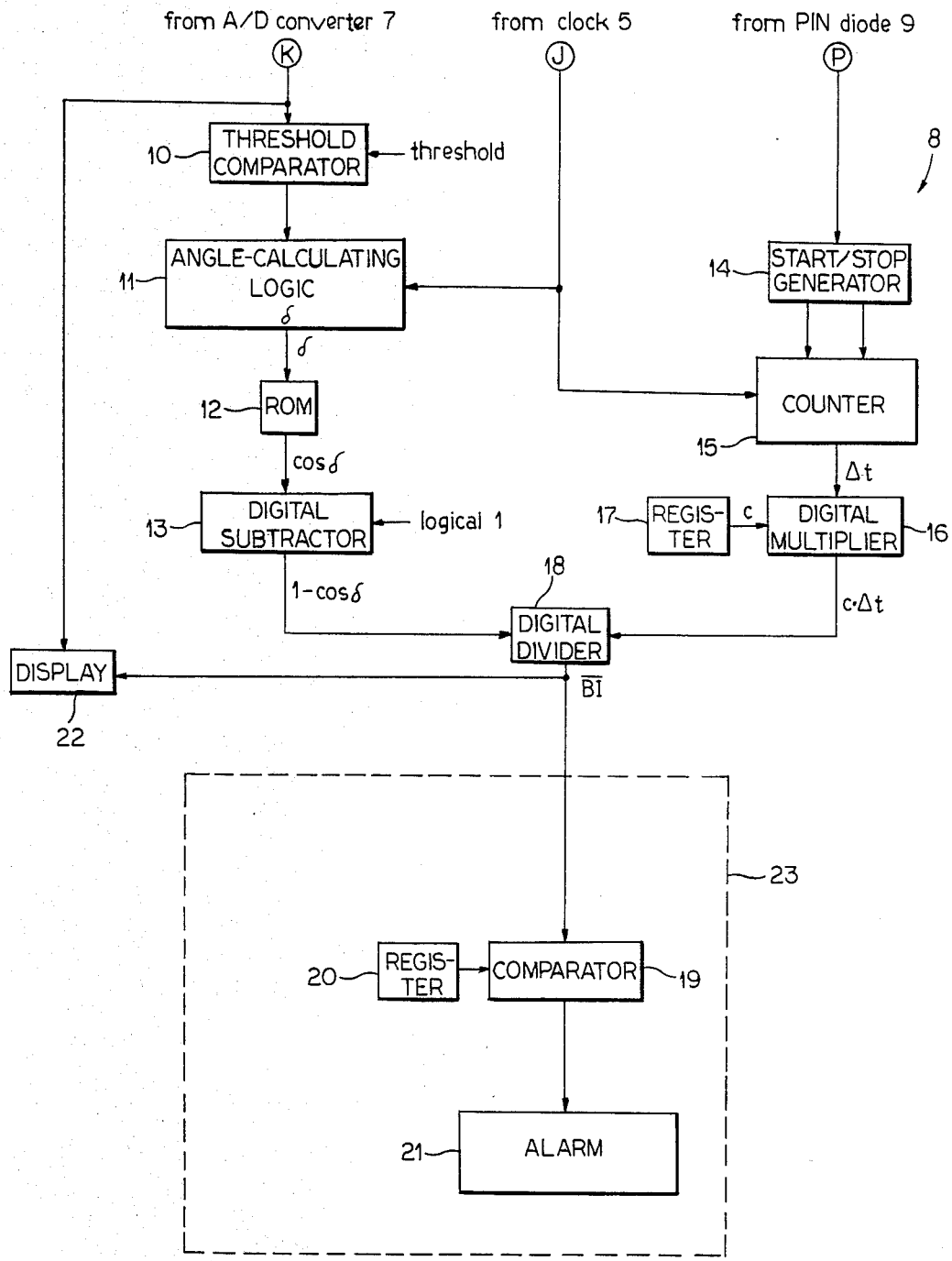
FIG. 5 is a more detailed diagram of a distance calculator and alarm generator included in the system of FIG. 4.

As shown in FIG. 5, arithmetic unit 8 comprises a threshold comparator 10 with an input connected to terminal K, this comparator working into an angle-calculating logic circuit 11 also receiving the clock pulses from terminal J in order to establish the time positions of two consecutively incoming laser pulses in the frame-scanning cycle in which they occur; the pulses of such a pair are presumed to be respectively due to a directly received and a reflected laser ray as discussed above. Since the times of readout are correlated with the positions of the light pulses on CCD matrix 4 of FIG. 4, they are also representative of the respective angles of incidence from which logic circuit 11 can derive the included divergence angle δ. The magnitude of angle δ is translated, by means of a read-only memory 12, into its cosine whose value is fed to a digital subtractor 13 also receiving a logical 1 on another input in order to calculate the denominator 1−cos δ of equation (2).

Upon the arrival of each laser pulse photodiode 9 also generates a voltage pulse on terminal P which, via a flip-flop 14 operating as a start/stop generator, controls a counter 15 stepped by clock pulses from terminal J. Thus, the first pulse of the aforementioned pair starts the counter 15 while the second one arrests it in a position indicating the elapsed time interval Δt whose numerical value is fed to a digital multiplier 16 also receiving the magnitude of propagation velocity c from a register 17. Counter 15 is reset by the clock 5 at the end of each frame-scanning cycle.

Multiplier 16 calculates the product c·Δt and delivers its value to a digital divider 18 also receiving the denominator 1−cos δ from subtractor 13. Divider 18, operating according to equation (2), establishes the estimated target distance r=$\overline{BI}$ and feeds that information to the one hand to display unit 22 and on the other hand to a comparator 19 forming part of a visual or acoustic indicator 23. Comparator 19 triggers an alarm generator 21 when the estimated distance $\overline{BI}$ falls within a certain range indicating the endangerment of a target within a predetermined radius of observation platform or station B.

This radius may vary with the nature of the potential targets, e.g. tanks or ships, and the type of threat to be guarded against, e.g. guided missiles or artillery shells, as well as with the scenario involved. In the case of guided missiles versus tanks, for instance, the radius may be about 50 meters with a wide-area scenario.

Consider, for example, a tank formation under attack from laser-guided missiles of the Copperhead or SALGP type. Such a firing system typically operates in a two-phase mode, with a first phase of at least 30 seconds—termed "indirect designation"—during which an area of some 30 to 50 meters around the targeted tank is illuminated by the laser; the second phase—termed "direct designation"—may last for 5 to 10 seconds and involves an adjustment of the trajectory of the missile to point it onto the target. With my present system, which enables the threat to be recognized already in the first phase of this sequence, the operator of the targeted tank can be alerted early enough to take effective countermeasures.

I claim:

1. A system disposed at an observation point for determining the distance therefrom of a nearby target area illuminated by a remote pulsed laser, comprising:
   receiving means responsive to pulses of incident laser radiation arriving in rapid succession from two different directions and assumed to be respectively due to direct illumination and to illumination by reflection from a target area;
   timing means coupled to said receiving means for measuring the interval elapsed between the arrivals of said pulses;
   trigonometic means coupled to said receiving means for calculating the angle included between the directions of incidence of said pulses; and
   arithmetic means connected to said timing means and to said trigonometric means for computing an estimate of the target distance from said interval and said angle.

2. A system as defined in claim 1 wherein said arithmetic means is programmed to operate according to the formula $$r = \frac{c \cdot \Delta t}{1 - \cos\delta}$$

where r is the estimated target distance, $\Delta t$ is said interval, $\delta$ is said angle and c is the propagation velocity of the laser radiation.

3. A system as defined in claim 1 wherein said receiving means comprises a wide-angle objective, an array of photodetectors positioned for illumination by said objective, and scanning means for registering the relative location of photodetectors excited by incoming laser pulses.

4. A system as defined in claim 1, further comprising comparison means connected to said arithmetic means for generating an alarm indication upon the estimated distance falling within a predetermined range.

* * * * *